(12) United States Patent
Yaguchi et al.

(10) Patent No.: US 10,352,280 B2
(45) Date of Patent: Jul. 16, 2019

(54) BLOW-BY GAS RECIRCULATION DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Hiroshi Yaguchi, Susono (JP); Takeshi Fukui, Susono (JP)

(73) Assignee: Toyota Jidosha kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/575,486

(22) PCT Filed: Jun. 29, 2016

(86) PCT No.: PCT/JP2016/003128
§ 371 (c)(1),
(2) Date: Nov. 20, 2017

(87) PCT Pub. No.: WO2017/010053
PCT Pub. Date: Jan. 19, 2017

(65) Prior Publication Data
US 2018/0156168 A1   Jun. 7, 2018

(30) Foreign Application Priority Data
Jul. 14, 2015   (JP) .................... 2015-140633

(51) Int. Cl.
*B60T 13/52* (2006.01)
*B60T 17/00* (2006.01)
(Continued)

(52) U.S. Cl.
CPC ....... *F02M 35/10229* (2013.01); *B60T 17/00* (2013.01); *B60T 17/02* (2013.01);
(Continued)

(58) Field of Classification Search
CPC ....... F02M 35/10229; F02M 35/10222; F02M 35/10255; F02M 25/06; F01M 13/0011;
(Continued)

(56) References Cited

U.S. PATENT DOCUMENTS 8,752,475 B2 * 6/2014 Cunningham .......... B60T 17/02
  303/11
9,957,905 B2 * 5/2018 Makihara ............ F02D 41/0007
(Continued)

FOREIGN PATENT DOCUMENTS

JP   62-165418   10/1987
JP   62-279220   12/1987
(Continued)

*Primary Examiner* — George C Jin
(74) *Attorney, Agent, or Firm* — Finnegan, Henderson, Farabow, Garrett & Dunner, LLP

(57) ABSTRACT

This blow-by gas recirculation device for an internal combustion engine of a vehicle is provided with a vacuum pump which supplies negative pressure to a brake booster. The blow-by gas recirculation device includes: a fresh-air introduction passage for introducing a fresh air into a crankcase from an intake passage upstream of a throttle valve; a PCV device for recirculating, to the intake passage downstream of the throttle valve, blow-by gas in the crankcase; and a suction/recirculation means which uses the vacuum pump to suck the blow-by gas from inside the crankcase, in a region where the blow-by gas ventilation quantity by the PCV device is insufficient, and recirculate the blow-by gas to the intake passage, while the fresh air is being introduced from the fresh-air introduction passage. As a result, the blow-by gas concentration in the crankcase is reduced, engine oil contact opportunities are reduced, and oil deterioration is inhibited.

8 Claims, 8 Drawing Sheets

(51) Int. Cl.
*F02M 35/10* (2006.01)
*F01M 13/00* (2006.01)
*B60T 17/06* (2006.01)
*F01M 13/02* (2006.01)
*B60T 17/02* (2006.01)

(52) U.S. Cl.
CPC ............. *B60T 17/06* (2013.01); *F01M 13/00* (2013.01); *F01M 13/0011* (2013.01); *F01M 13/021* (2013.01); *F02M 35/10222* (2013.01); *B60T 13/52* (2013.01); *F01M 2013/0044* (2013.01); *F01M 2013/026* (2013.01)

(58) Field of Classification Search
CPC ............... F01M 13/021; F01M 13/023; F01M 2013/0044; F01M 2013/026; F01M 2013/027; F01M 2013/0038; F01M 2013/0005
See application file for complete search history.

(56) References Cited

U.S. PATENT DOCUMENTS

| | | | | |
|---|---|---|---|---|
| 2012/0247438 A1* | 10/2012 | Konohara | ............ | F01M 13/022 123/559.1 |
| 2015/0053188 A1* | 2/2015 | Kuribayashi | ......... | F02B 37/183 123/574 |

FOREIGN PATENT DOCUMENTS

| | | |
|---|---|---|
| JP | 7-83018 | 3/1995 |
| JP | 2010-25022 | 2/2010 |

\* cited by examiner

BLOW-BY GAS RECIRCULATION DEVICE FOR INTERNAL COMBUSTION ENGINE

TECHNICAL FIELD

The present invention relates to a blow-by gas recirculation device for an internal combustion engine, and more particularly, to a blow-by gas recirculation device for an internal combustion engine in a vehicle provided with a vacuum pump for supplying a negative pressure to a brake booster.

BACKGROUND ART

In general, a vehicle braking system is equipped with a brake booster for assisting a brake pedal operation by a driver. To a negative pressure chamber of the brake booster is supplied a negative pressure from a vacuum pump. The brake booster utilizes this negative pressure to boost the power of the brake pedal operation.

In an internal combustion engine, there has been known a blow-by gas recirculation device for recirculating unburnt gas (i.e., blow-by gas) leaking through a gap between a piston and a cylinder during a compression stroke to an intake system of the engine so as to process the unburnt gas. In, for example, a blow-by gas recirculation device disclosed in PTL1, a communication hole is formed so as to allow a crankcase and a chamber inside of a cylinder head cover to communicate with each other; a suction port and an exhaust port of a vacuum pump for supplying a negative pressure to a brake booster are opened to the crankcase and the chamber inside of the cylinder head cover via conduits, respectively; and furthermore, a control valve is disposed on the conduit led to the crankcase in such a manner as to be opened only when a difference in pressure between the crankcase and the chamber inside of the cylinder head cover becomes a predetermined value or higher. In this manner, while in the open state of the control valve which allow recirculating the blow-by gas, by the vacuum pump, the blow-by gas is sucked from the crankcase and is fed to the chamber inside of the cylinder head cover.

CITATION LIST

Patent Literature

[PTL 1] Japanese Patent Laid-Open No. S62-279220 (1987)

SUMMARY OF INVENTION

Technical Problem

In the blow-by gas recirculation device disclosed in PTL1, the blow-by gas is once sucked from the crankcase by the vacuum pump, and then, is fed to the chamber inside of a cylinder head cover. A negative pressure is caused inside of the crankcase by the suction by the vacuum pump, and therefore, the blow-by gas staying in the chamber inside of a cylinder head cover is returned to and circulated in the crankcase through the communication hole that allows the crankcase and the chamber inside of a cylinder head cover to communicate with each other. As a consequence, the concentration of the blow-by gas staying inside of the crankcase cannot become low, thereby raising a problem of an increase in risk of contact of the blow-by gas of high concentration with engine oil. In this manner, if the risk of contact increases without any decrease in concentration of the blow-by gas, NOx contained in the blow-by gas is further contributory to degradation of the engine oil caused by oxidization.

The present invention has been accomplished in view of the above-described circumstances experienced by the prior art. An object of the present invention is to provide a blow-by gas recirculation device for an internal combustion engine utilizing a vacuum pump, the blow-by gas recirculation device for an internal combustion engine being capable of reducing the concentration of blow-by gas staying inside of a crankcase, and furthermore, of reducing the risk of contact of the blow-by gas with engine oil so as to inhibit the degradation of the oil.

Solution to Problem

According to one aspect of a blow-by gas recirculation device for an internal combustion engine of the present invention that achieves the above-described object, a blow-by gas recirculation device for an internal combustion engine, the blow-by gas recirculation device including a vacuum pump serving as a negative pressure source for a brake booster, and furthermore, being utilizable for recirculating blow-by gas to an intake passage, the blow-by gas recirculation device includes: a fresh-air introduction passage configured to introduce fresh air into a crankcase from an intake passage upstream of a throttle valve; a PCV (Positive Crankcase Ventilation) device configured to recirculate at least a part of blow-by gas staying inside of the crankcase to an intake passage downstream of the throttle valve; and sucking/recirculating means configured to suck the blow-by gas staying inside of the crankcase while introducing fresh air from the fresh-air introduction passage by the use of the vacuum pump in a region in which the ventilation quantity of the blow-by gas by the PCV device is insufficient, so as to recirculate the blow-by gas to the intake passage upstream of the throttle valve.

With the configuration according to the above-described aspect, fresh air is introduced into the crankcase from the fresh-air introduction passage while the PCV device recirculates at least a part of the blow-by gas staying inside of the crankcase to the intake passage downstream of the throttle valve in a natural intake operating region, that is, a non-supercharging operating region. The sucking/recirculating means introduces fresh air from the fresh-air introduction passage while sucking the blow-by gas staying inside of the crankcase by the use of the vacuum pump so as to recirculate the blow-by gas to the intake passage in the region in which the ventilation quantity of the blow-by gas by the PCV device is insufficient in the non-supercharging and supercharging operating regions. In this manner, the inside of the crankcase is ventilated with the fresh air in almost all of the operating regions, thus reducing the concentration of the blow-by gas inside of the crankcase, and furthermore, reducing the risk of contact of the blow-by gas with oil. As a consequence, the degradation of the oil can be remarkably inhibited.

Here, it is preferable that in the case where the internal combustion engine should be an internal combustion engine with a turbocharger having a compressor on the intake passage, the sucking/recirculating means should include: a first piping passage that allows the brake booster to communicate with a suction port of the vacuum pump and has a first check valve on the way; a second piping passage that communicates with the inside of the crankcase and merges with the first piping passage between the suction port of the vacuum pump and the first check valve, the second piping passage having a control valve on the way; a third piping passage that is branched from the first piping passage between the brake booster and the first check valve, and has a second check valve on the way so as to communicate with, the intake passage downstream of the compressor of the turbocharger; a fourth piping passage communicating with an exhaust port of the vacuum pump, the fourth piping passage merging with both of a fifth piping passage communicating with the intake passage upstream of the compressor and downstream of an inlet of the fresh-air introduction passage and a sixth piping passage communicating with the intake passage downstream of the compressor of the turbocharger; and flow direction restricting means that are disposed on the fourth to sixth piping passages so as to permit only a flow directed to a downstream side from the vacuum pump.

According to this aspect, when the vacuum pump is used to recirculate the blow-by gas staying inside of the crankcase to the intake passage, the control valve is opened so that fresh air is introduced into the crankcase through the fresh-air introduction passage that allows the intake passage upstream of the turbocharger to communicate with the inside of the crankcase. The blow-by gas staying inside of the crankcase, into which the fresh air is introduced, is sucked by the vacuum pump through the second piping passage that communicates with the inside of the crankcase, merges with the first piping passage between the suction port of the vacuum pump and the first check valve, and has the control valve disposed on the way. Moreover, the blow-by gas containing the fresh air sucked by the vacuum pump is discharged to the fourth piping passage communicating with the exhaust port of the vacuum pump. Here, the fourth piping passage merges with both of the fifth piping passage and the sixth piping passage, wherein the fifth piping passage communicates with the intake passage upstream of the compressor and downstream of the inlet of the fresh-air introduction passage and the sixth piping passage communicates with the intake passage downstream of the compressor of the turbocharger. Therefore, the blow-by gas containing the fresh air discharged from the vacuum pump flows in the fifth piping passage that communicates with not the intake passage having a pressure higher than the atmospheric pressure, downstream of the compressor, but the intake passage having the atmospheric pressure, upstream of the compressor and downstream of the inlet of the fresh-air introduction passage in the supercharging region. At this time, the flow direction restricting means that are disposed on the fourth to sixth piping passages and permit only the flow directed to a downstream side from the vacuum pump prevent the fresh air staying in the intake passage downstream of the compressor whose pressure is supercharged higher than the atmospheric pressure from releasing to the intake passage upstream of the compressor through the sixth piping passage and the fifth piping passage. In the meantime, the blow-by gas containing the fresh air flows in the sixth piping passage communicating with the intake passage whose pressure is lower than the atmospheric pressure and which is disposed downstream of the compressor, in the non-supercharging region. At this time, the flow direction restricting means that are disposed on the fourth to sixth pipeline passages and permit only the flow directed to a downstream side from the vacuum pump prevent the fresh air staying upstream of the compressor and having the atmospheric pressure from flowing in the intake passage downstream of the compressor via the fifth piping passage and the sixth piping passage.

Moreover, it is preferable that in the case where the internal combustion engine is of a natural aspiration type, the sucking/recirculating means should include: a first piping passage that allows the brake booster to communicate with a suction port of the vacuum pump and has a first check valve on the way; a second piping passage that communicates with the inside of the crankcase and merges with the first piping passage between the suction port of the vacuum pump and the first check valve, the second piping passage having a control valve on the way; a third piping passage that is branched from the first piping passage between the brake booster and the first check valve, and has a second check valve on the way so as to communicate with the intake passage downstream of the throttle valve; a fourth piping passage communicating with an exhaust port of the vacuum pump, the fourth piping passage merging both of a fifth piping passage communicating with the intake passage upstream of the throttle valve and downstream of an inlet of the fresh-air introduction passage and a sixth piping passage communicating with the intake passage downstream of the throttle valve; and flow direction restricting means that are disposed on the fourth to sixth piping passages so as to permit only a flow directed to a downstream side from the vacuum pump.

Additionally, the flow direction restricting means may be configured with a third check valve disposed on the way of the fifth piping passage and a fourth check valve disposed on the way of the sixth piping passage.

With the configuration, the pressure of the blow-by gas containing fresh air discharged from the vacuum pump uniformly acts on the third check valve disposed on the way of the fifth piping passage and the fourth check valve disposed on the way of the sixth piping passage, thus automatically opening the check valve having a large difference in pressure from the recirculation destination of the blow-by gas. Consequently, the third check valve is opened in the supercharging region, and then, the blow-by gas containing fresh air flows in the fifth piping passage communicating with not the intake passage downstream of the compressor, having a pressure higher than the atmospheric pressure, but the intake passage upstream of the compressor, having the atmospheric pressure. In contrast, the forth check valve is opened in the non-supercharging region, and then, the blow-by gas containing fresh air flows in the sixth piping passage communicating with the intake passage downstream of the compressor, having a pressure lower than the atmospheric pressure. In this manner, since the third and fourth check valves are automatically opened according to the difference in pressure from the recirculation destination of the blow-by gas, no special control means is required, thus simplifying the control.

Furthermore, the flow direction restricting means may be disposed at a confluent point among the fourth to sixth piping passages, and may be configured with a three-way switch valve for switch a channel from the fourth piping passage.

With the configuration, the channel for the blow-by gas containing fresh air discharged from the vacuum pump, the channel consisting of the fourth piping passage and fifth piping passage is switched to the channel consisting of the fourth piping passage and the sixth piping passage by the switch valve, and vice versa. As a consequence, in the supercharging region, the switch valve selects the channel for the blow-by gas from the fourth piping passage to the fifth piping passage, and thus, the blow-by gas containing fresh air flows in the fifth piping passage. In contrast, in the non-supercharging region, the switch valve selects the channel from the fourth piping passage to the sixth piping passage, and thus, the blow-by gas containing fresh air flows in the sixth piping passage. In this manner, since this configuration requires only one switch valve, the configuration can be simplified without any need of two check valves.

Here, it is preferable that the blow-by gas recirculation device for an internal combustion engine should further include: pressure detecting means configured to detect an intake pressure at the intake passage downstream of the turbocharger and a brake negative pressure at the brake booster; and control means configured to control the actuation of each of the control valve and the electric vacuum pump based on the detection result from the pressure detecting means, wherein the control means should be configured to control so as to suck the blow-by gas and recirculate the blow-by gas onto the intake passage by actuating the electric vacuum pump and opening the control valve when the detected brake negative pressure takes a predetermined value, and furthermore, the intake pressure falls within a predetermined range.

Incidentally, the three-way switch valve may be controlled based on the intake pressure detected by the pressure detecting means so as to switch a flow direction during supercharging and a flow direction during non-supercharging.

Advantageous Effects of Invention

The present invention can produce excellent advantageous effects that the concentration of the blow-by gas can be reduced, the risk of contact of the blow-by gas with engine oil can be remarkably reduced, and the degradation of oil can be inhibited.

DESCRIPTION OF EMBODIMENTS

The following section will describe the embodiments of the present invention based on the attached drawings. Incidentally, the present invention is not limited to the following embodiments.

First Embodiment

Figure 1:
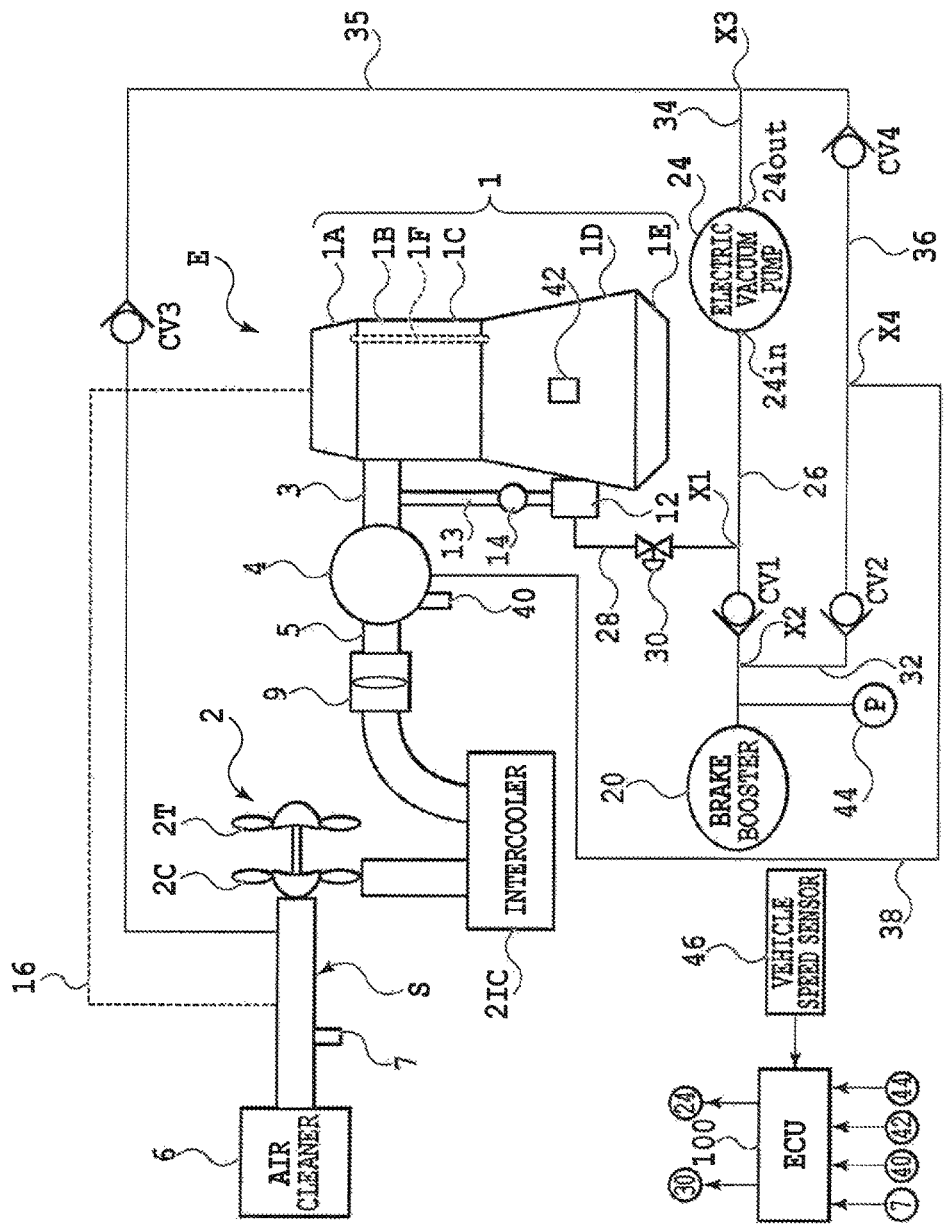
FIG. 1 is a schematic view illustrating a configuration of a first embodiment of a blow-by gas recirculation device for an internal combustion engine with a turbocharger according to the present invention.

FIG. 1 illustrates the configuration of a first embodiment of a blow-by gas recirculation device for an internal combustion engine with a turbocharger according to the present invention. The blow-by gas recirculation device in the present embodiment is applied to an internal combustion engine E mounted on a vehicle provided with a brake booster. The internal combustion engine E has an engine body 1. The engine body 1 includes, as well known, a head cover 1A, a cylinder head 1B, a cylinder block 1C, a crankcase 1D, and an oil pan 1E. The engine body 1 incorporates a piston, a connecting rod, a crankshaft, and the like therein, and furthermore has a communication hole 1F penetrating through the cylinder head 1B and the cylinder block 1C. The communication hole 1F allows the head cover 1A and the inside of the crankcase 1D to communicate with each other. The internal combustion engine E illustrated in FIG. 1 is a multi-cylinder gasoline engine provided with a turbocharger 2 as a supercharger. Here, the number of cylinders, the layouts of cylinders (a straight type, a V type, a horizontally opposed type, and the like), and the like in the internal combustion engine E are not particularly restricted.

An intake port of each of the cylinders connected to a surge tank 4 serving as an intake collection chamber via a branch pipe 3 for each of the cylinders. An intake pipe 5 is connected to the upstream side of the surge tank 4. To the intake pipe 5 are arranged an air cleaner 6, an air flow meter 7 for detecting an intake air quantity, a compressor of the turbocharger 2, an intercooler 2IC, and an electronically controlled type throttle valve 9 in this order from upstream to downstream. The intake port, the branch pipe 3, the surge tank 4, and the intake pipe 5 form an intake passage S. Although not illustrated, with respect to each of the cylinders, an injector (i.e., a fuel injection valve) for injecting fuel is installed inside of the intake port, and furthermore, an ignition plug is installed inside of a combustion chamber.

In the meantime, an exhaust port of each of the cylinders is connected to a common exhaust pipe via an exhaust manifold, not illustrated. These exhaust port, exhaust manifold, and exhaust pipe form an exhaust passage. A turbine 2T of the turbocharger 2 is installed in the exhaust passage, and a three-way catalyst is arranged downstream of the turbine 2T. Although not illustrated, a bypass passage that bypasses the turbine 2T and an electronically controlled type wastegate valve for opening or closing the bypass passage are disposed on the exhaust passage. The wastegate valve is a butterfly valve similar to the throttle valve 9, and its opening degree can continuously varied.

An oil separator 12 is attached to the crankcase 1D of the engine body 1. The oil separator 12 communicates with the inside of the crankcase 1D, and thus, introduces blow-by gas thereinto from the crankcase 1D, and then, separates oil contained in the blow-by gas.

The oil separator 12 and the surge tank 4 or the branch pipe 3 disposed downstream of the surge tank 4 communicate with each other via a first blow-by gas passage 13. In the first blow-by gas passage 13 is placed a positive crankcase ventilation (hereinafter abbreviated as "PCV") valve 14. The first blow-by gas passage 13 and the PCV valve 14 form a PCV device. When the PCV valve 14 is opened, the blow-by gas staying inside of the crankcase 1D is recirculated to the surge tank 4 through the oil separator 12 and the first blow-by gas passage 13 in this order.

Moreover, the inside of the head cover 1A and the intake passage S downstream of the air flow meter 7 and upstream of the compressor 2C communicate with each other via a fresh-air introduction passage 16. Incidentally, the oil separator 12 communicates with a booster passage 26 via a second blow-by gas passage 28, as described later.

In the meantime, the vehicle is provided with a brake booster 20 for assisting the operation of a brake pedal by a driver. The brake booster 20 is adapted to boost a brake pedal operation force during a brake actuation by the use of a negative pressure that is supplied to a negative pressure chamber of the brake booster 20 and held therein.

Figure 2:
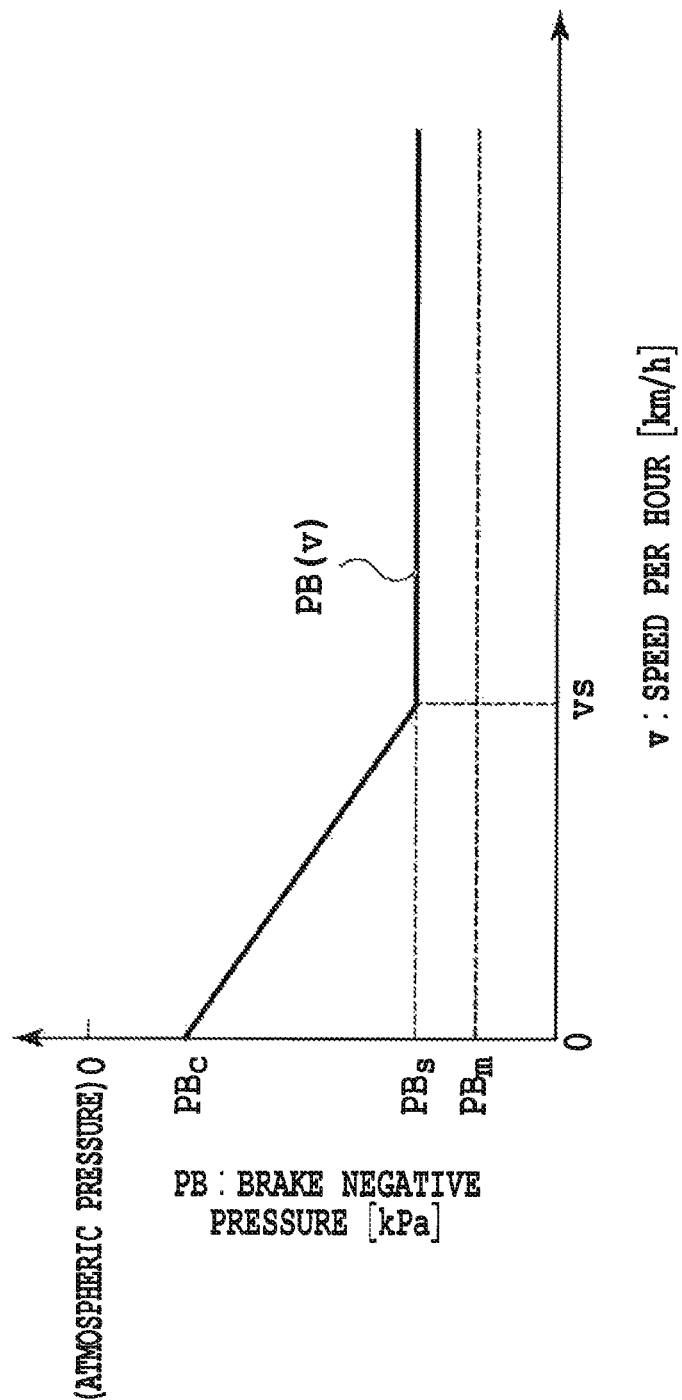
FIG. 2 is a graph (i.e., a map) illustrating the relationship between a vehicle speed and a negative pressure that should be secured inside of a brake booster.

Here, explanation will be made on the relationship between a brake negative pressure that should be secured in the negative pressure chamber of the brake booster 20 and a vehicle speed. FIG. 2 is a graph in which a lateral axis represents a vehicle speed v (km/h) and a vertical axis represents a brake negative pressure PB (kPa). In general, as the vehicle speed v becomes higher, a longer brake time or a larger brake force is required. Therefore, the brake negative pressure PB takes a value PBs that is set to be much more negative than the atmospheric pressure in a region in which the vehicle speed exceeds a predetermined middle speed vs. In contrast, a large brake force is not so much required between zero to the predetermined middle speed vs. Therefore, the brake negative pressure PB is set to be linearly varied from a brake negative pressure PBc approximate to the atmospheric pressure to the above-described brake negative pressure PBs that is set to be much more negative. Incidentally, in the case where the negative pressure is consumed (or reduced) beyond a set line PB(v) of the brake negative pressure PB (i.e., upward in FIG. 2), it is determined that a predetermined value of the brake negative pressure PB is not secured, and then, a vacuum pump is actuated so as to start the production of a brake negative pressure. As a result of the production of the brake negative pressure PB, when the brake negative pressure PB reaches a lower limit value PBm in FIG. 2, the actuation of the vacuum pump is stopped.

The negative pressure chamber of the brake booster 20 and a suction port 24in of an electric vacuum pump 24 communicate with each other via the booster passage serving as a first piping passage. On the booster passage 26 is disposed a first check valve CV1 that permits only air to flow forward from the brake booster 20 to the electric vacuum pump 24 whereas prohibits the air from flowing reversely. The first check valve CV1 can prevent the negative pressure from leaking from the negative pressure chamber. Moreover, the oil separator 12 and the booster passage 26 communicate with each other via the second blow-by gas passage 28 serving as a second piping passage that merges with the booster passage 26 at a confluent point X1 between the first check valve CV1 and the suction port 24in of the electric vacuum pump 24. On the second blow-by gas passage 28 is disposed a control valve 30 including a solenoid switch valve.

The control valve 30 takes a first position (i.e., a close position), at which the blow-by gas is prohibited from flowing from the oil separator 12 to the electric vacuum pump 24 through the second blow-by gas passage 28 and the booster passage 26, and a second position (i.e., an open position), at which the blow-by gas is permitted to flow there.

Moreover, a third piping passage 32 is arranged in such a manner as to be branched from the booster passage 26 at a branch point X2 between the brake booster 20 and the first check valve CV1 and to have a second check valve CV2 on the way. Additionally, a fourth piping passage 34 is arranged in such a manner as to communicate with an exhaust port 24out of the electric vacuum pump 24. The fourth piping passage 34 merges, at a confluent point X3, with both of a fifth piping passage (i.e., a third blow-by gas passage). 35 that communicates with the intake passage S upstream of the compressor 2C of the turbocharger 2 and downstream of an inlet of the fresh-air introduction passage 16 and a sixth piping passage 36. In the present embodiment, a third check valve CV3 that prohibits gas from flowing from the intake passage S toward the electric vacuum pump 24 is disposed on the fifth piping passage 35. Furthermore, a fourth check valve CV4 that permits only a flow directed to a downstream side from the electric vacuum pump 24 is disposed on the sixth piping passage 36, described later. Here, the third check valve CV3 and the fourth check valve CV4 function as flow direction restricting means for permitting only a flow directed to a downstream side from the electric vacuum pump 24.

In the embodiment illustrated in FIG. 1, the third piping passage 32 and the sixth piping passage 36 merge with each other at a confluent point X4, and thus, communicate with the surge tank 4 through a seventh piping passage 38 merging at the confluent point X4. Here, the third piping passage 32 and the sixth piping passage 36 may not merge on the way but may communicate directly with the surge tank 4. Although repeated, the second check valve CV2 and the fourth check valve CV4 that prohibit the air from reversely flowing from the surge tank 4 to the electric vacuum pump 24 are disposed on the third piping passage 32 and the sixth piping passage 36, respectively.

Incidentally, the third piping passage 32 and the seventh piping passage 38 are adapted to supply a negative pressure from the surge tank 4 or the like to the negative pressure chamber of the brake booster 20 when an intake pressure is lower than the brake negative pressure of the brake booster 20. When the intake pressure is lower than the brake negative pressure, the negative pressure is supplied to the negative pressure chamber of the brake booster 20 via the second check valve CV2. The sixth piping passage 36 having the fourth check valve CV4 disposed thereon and the seventh piping passage 38 are designed to return, to the surge tank 4 in a negative pressure state, gas discharged from the exhaust port 21out of the electric vacuum pump 24 to the fourth piping passage 34, so as to reduce a drive load on the electric vacuum pump 24.

Here, the blow-by gas recirculation device in the present embodiment is provided with an electronic control unit (hereinafter abbreviated as "ECU") 100 serving as a controller or a control unit. The ECU 100 is configured to control not only the control valve 30 and the electric vacuum pump 24 but also the above-described throttle valve 9, injector, ignition plug, and wastegate valve. Besides, the ECU 100 is configured to control the internal combustion engine E and various devices, not illustrated, of the vehicle.

As to sensors, in addition to the above-described air flow meter 7, to the ECU 100 is connected an intake pressure sensor 40 for detecting a pressure inside of the intake passage S downstream of the compressor 2C, more particularly, downstream of the throttle valve 9 (referred to as an intake pressure), a crank angle sensor for detecting a rotation angle (crank angle) of the crankshaft of the internal combustion engine E, a pressure sensor 44 for detecting a pressure at the negative pressure chamber of the brake booster 20, and a vehicle speed sensor 46.

The ECU 100 detects a crank angle per se in response to a crank pulse signal output from the crank angle sensor 42, and furthermore, detects an engine speed (rpm). Here, the term "engine speed" refers to an engine speed per unit time, and is a synonym of a rotational speed.

The ECU 100 detects an intake air quantity that signifies the quantity of intake air per unit time in response to a signal output from the air flow meter 7. Moreover, the ECU 100 detects a load on the engine 1 based on the detected intake air quantity.

Here, a description will be given of a function in a natural aspiration type internal combustion engine in the embodiment according to the present invention. The natural aspiration type internal combustion engine is identical to the internal combustion engine with the turbocharger illustrated in FIG. 1 except that the turbocharger 2 including the compressor 2C of an intake system, the turbine 2T of an exhaust system, and the wastegate valve, and the intercooler 21C are not provided. Therefore, the natural aspiration type internal combustion engine is not illustrated anew, and the description will be given on the assumption of their absence.

The natural aspiration type internal combustion engine can recirculate blow-by gas staying inside of the crankcase 1D to the intake passage S (i.e., the surge tank 4) by the use of the PCV device (including the first blow-by gas passage 13 and the PCV valve 14) in a predetermined operating region. In other words, since a pressure downstream of the PCV valve 14 (i.e., on the side of the surge tank 4) is lower than a pressure upstream thereof (i.e., on the side of the crankcase 1D), the PCV valve 14 is opened, thus achieving the recirculation of the blow-by gas.

Figure 3:
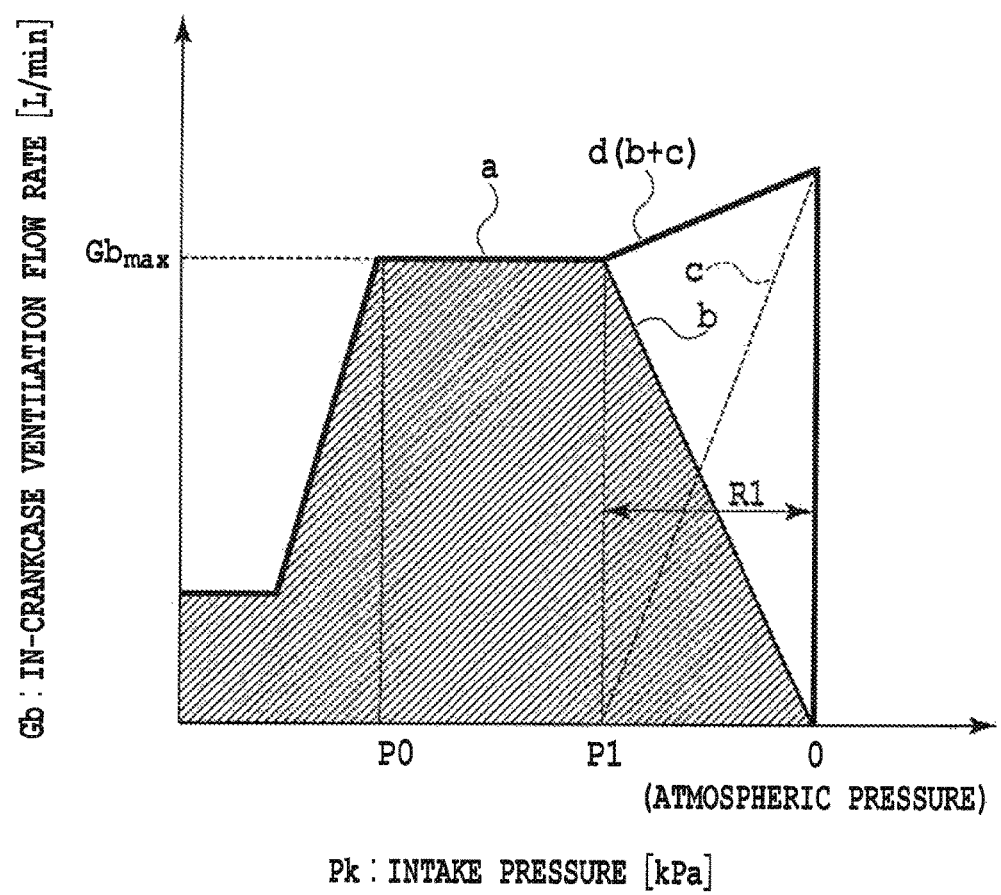
FIG. 3 is a graph illustrating the relationship between an intake pressure Pk at an intake passage and an in-crankcase ventilation flow rate Gb in a natural aspiration type internal combustion engine according to the present invention.

Specifically, the relationship between an intake pressure Pk (kPa) of the intake passage S and an in-crankcase ventilation flow rate Gb (L/min) in the natural aspiration type internal combustion engine is illustrated in FIG. 3. Here, the intake pressure Pk refers to a pressure inside of the intake passage S downstream of the throttle valve 9, and specifically, to an intake pressure Pk inside of the surge tank 4, detected by the intake pressure sensor 40. The pressure is represented by a gage pressure with a difference with reference to the atmospheric pressure. As is obvious from FIG. 3, the in-crankcase ventilation flow rate Gb equivalent to a maximum flow rate Gbmax can be achieved, by the PCV device, in an operating region in which a pressure ranges from P0 to P1 out of operating regions in which the intake pressure Pk is lower than a pressure P1.

However, as the intake pressure Pk approaches the atmospheric pressure beyond the pressure P1 within the operating region in which the intake pressure Pk ranges from the pressure P1 to the atmospheric pressure (i.e., the intake pressure Pk=0), a blow-by gas recirculation quantity by the PCV device or the in-crankcase ventilation flow rate Gb starts to be decreased, thereby making it difficult to satisfactorily ventilate the inside of the crankcase. In other words, as the intake pressure Pk increases within the intake pressure in which P1≤Pk≤0, the in-crankcase ventilation flow rate Gb by the PCV device gradually decreases from the maximum flow rate Gbmax indicated by a thick solid line a, and finally it becomes zero (see a thick solid line b). The range of the intake pressure in the operating region in which the PCV ventilation flow rate in the natural aspiration type internal combustion engine is not sufficient is expressed by a PCV ventilation flow rate shortage region P1 in FIG. 4. Hereinafter, the intake pressure P1 at which the shortage of the ventilation flow rate starts will be referred to as a shortage start intake pressure P1.

In view of the above, in the natural aspiration type internal combustion engine according to the embodiment of the present invention, when the intake pressure Pk becomes the shortage start intake pressure P1, the electric vacuum pump 24 is actuated, and furthermore, the control valve 30 is opened so as to recirculate the blow-by gas by the use of the electric vacuum pump 24 (see a broken line c in the drawing). In this manner, it is possible to compensate or complement the in-crankcase ventilation flow rate Gb that is insufficient according to the PCV device (see a thick solid line d (=b+c) in the drawing) so as to achieve a satisfactory in-crankcase ventilation flow rate Gb.

Next, explanation will be made on the function of the blow-by gas recirculation device for the internal combustion engine with the turbocharger according to the embodiment of the present invention. In the internal combustion engine according to the embodiment of the present invention, the blow-by gas staying inside of the crankcase 1D is recirculated to the intake passage S (i.e., the surge tank 4) by the use of the PCV device (i.e., the first blow-by gas passage 13 and the PCV valve 14) in a low load operating region of non-supercharging in which supercharging is not performed, like in the above-described natural aspiration type internal combustion engine. In other words, since a pressure downstream of the PCV valve 14 (i.e., on the side of the surge tank 4) is lower than a pressure upstream thereof (i.e., on the side of the crankcase 1D), the PCV valve 14 is opened, thus achieving the recirculation of the blow-by gas.

Figure 4:
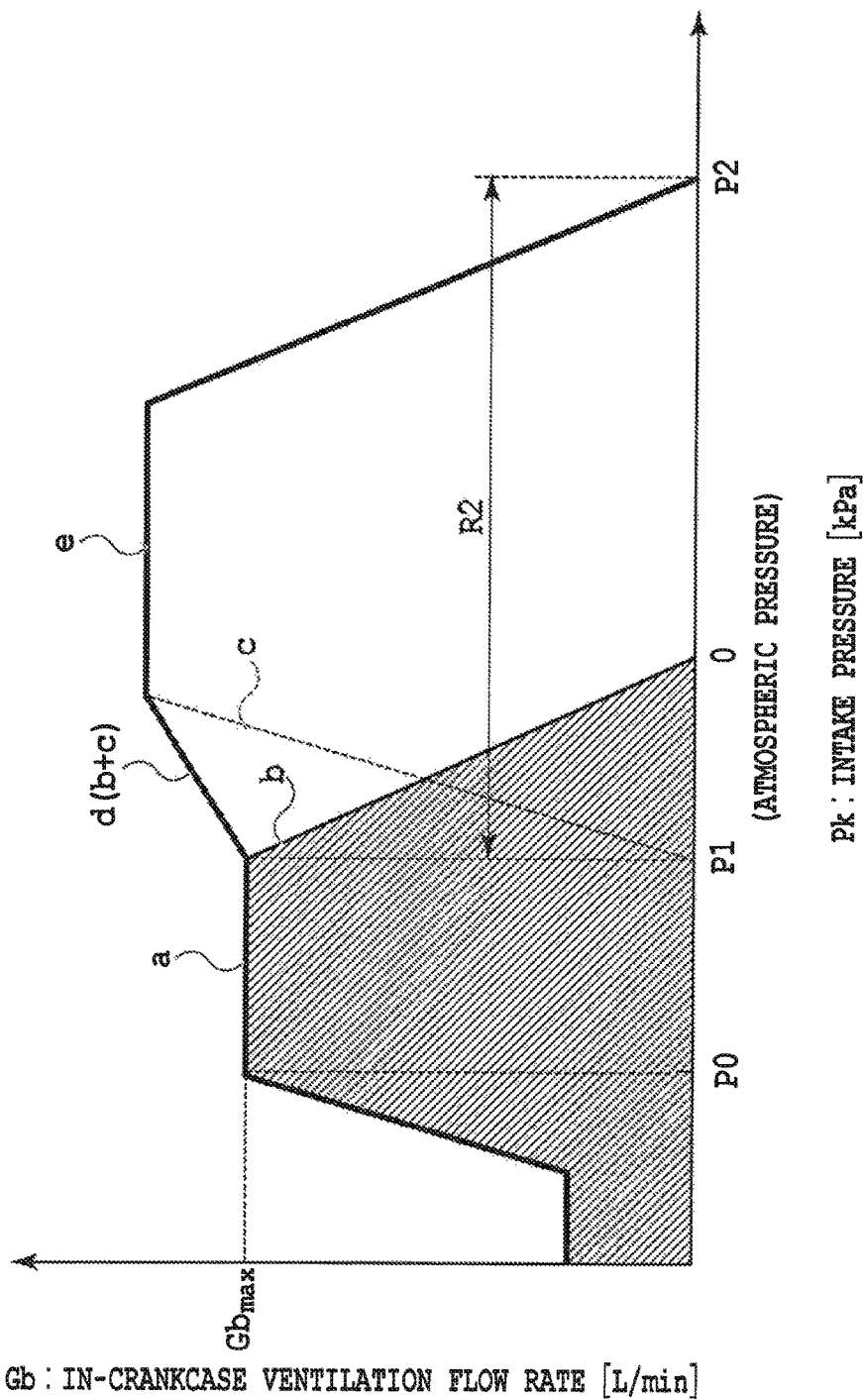
FIG. 4 is a graph illustrating the relationship between an intake pressure Pk at an intake passage and an in-crankcase ventilation flow rate Gb in the internal combustion engine with the turbocharger according to the present invention.

Specifically, the relationship between the intake pressure Pk (kPa) of the intake passage S and the in-crankcase ventilation flow rate Gb (L/min) in the internal combustion engine with the turbocharger according to the present invention is as illustrated in FIG. 4. Here, the intake pressure Pk refers to a pressure inside of the intake passage S downstream of the throttle valve 9, and specifically, to an intake pressure Pk inside of the surge tank 4 to be detected by the intake pressure sensor 40. The pressure is represented by a gage pressure with a difference with reference to the atmospheric pressure. As is obvious from FIG. 4, the PCV device can give the in-crankcase ventilation flow rate Gb equivalent to the maximum flow rate Gbmax in an operating region between a pressure P0 and a pressure P1 in the region in which the intake pressure Pk is lower than the pressure P1 out of non-supercharging operating regions in which supercharging is not performed.

However, in the operating region in which the intake pressure Pk falls between the pressure P1 and the atmospheric pressure (where the intake pressure Pk=0) in the same non-supercharging operating region, as the intake pressure Pk approaches the atmospheric pressure beyond the pressure P1, the blow-by gas recirculation quantity or the in-crankcase ventilation flow rate Gb by the PCV device is decreased, thereby making it difficult to satisfactorily ventilate the inside of the crankcase. In other words, within the intake pressure range in which P1≤Pk≤0, as the intake pressure Pk increases, the in-crankcase ventilation flow rate Gb by the PCV device gradually decreases, and finally, down to 0 (see a thick solid line b) from the maximum flow rate Gbmax indicated by a thick solid line a. Thereafter, as the supercharged pressure increases, the intake pressure Pk increases up to a positive supercharged pressure P2 that is higher than the atmospheric pressure whereas the in-crankcase ventilation flow rate Gb remains zero by the PCV device. FIG. 4 illustrates that a PCV ventilation flow rate shortage region R2 represents the intake pressure range in which P1≤Pk≤P2, including an operating region in which the in-crankcase ventilation flow rate Gb by the PCV device is not sufficient and the operating region in which the in-crankcase ventilation flow rate Gb is zero. Hereinafter, the intake pressure P1 at which the shortage of the ventilation flow rate starts will be referred to as a shortage start intake pressure P1.

In view of the above, in the internal combustion engine with the turbocharger in the present embodiment, when the intake pressure Pk becomes the shortage start intake pressure P1, the blow-by gas staying in the crankcase is sucked to be thus recirculated to the intake passage while fresh air is introduced from the fresh-air introduction passage 16 by the use of the electric vacuum pump 24 by the sucking/recirculating means (see a broken line c in FIG. 4). In this manner, it is possible to compensate or complement the in-crankcase ventilation flow rate Gb that is insufficient according to the PCV device (see a thick solid line d (=b+c) in FIG. 4) so as to achieve a satisfactory in-crankcase ventilation flow rate Gb.

Figure 5:
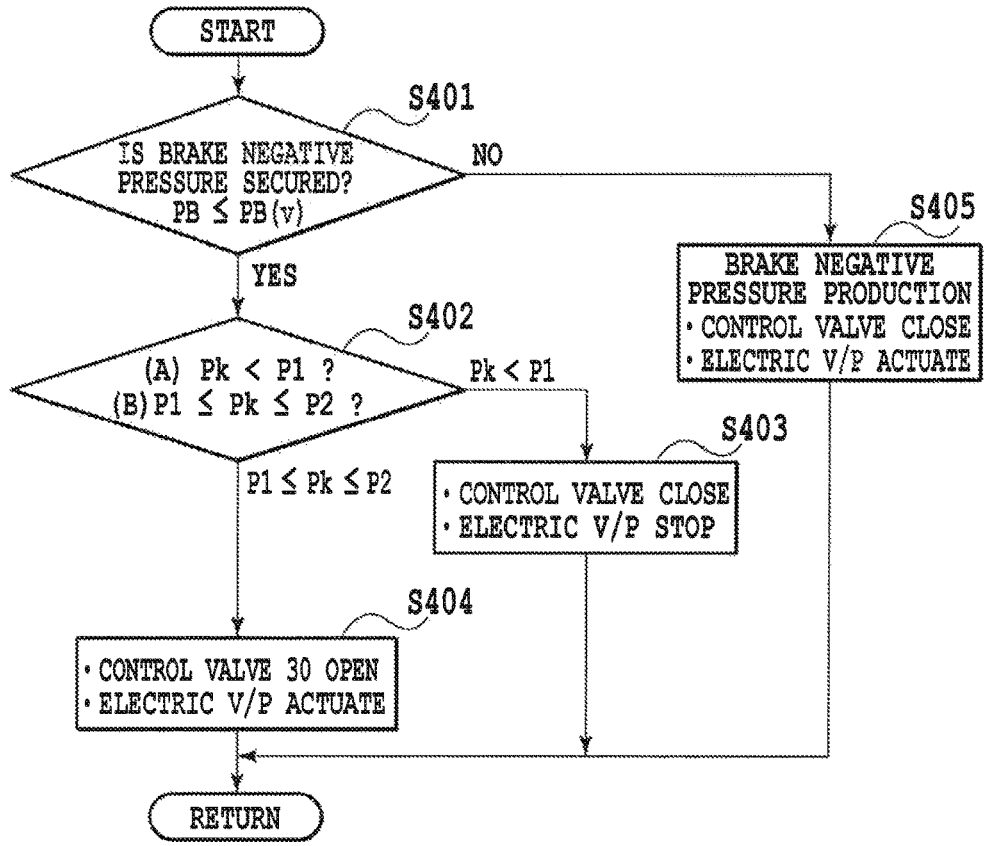
FIG. 5 is a flowchart illustrating one example of a control routine in the blow-by gas recirculation device for the internal combustion engine with the turbocharger according to the present invention.

FIG. 5 illustrates one example of a control routine in the above-described internal combustion engine with the turbocharger. This routine is repeatedly executed per predetermined arithmetic cycle by the ECU 100.

In step S401 in which control is started, it is determined whether or not the brake negative pressure PB of the brake booster 20, detected by the pressure sensor 44 secures a predetermined value. For example, it is determined whether or not the brake negative pressure PB is consumed (i.e., reduced) in excess of the set line PB (v) that is set according to a vehicle speed. In other words, it is determined whether or not a predetermined brake negative pressure PB is secured (PB≤PB (v)?). If it is secured (Yes), the control proceeds to step S402, in which it is determined whether or not the engine is in the operating region in which the in-crankcase ventilation flow rate Gb by the above-described PCV device is insufficient.

In particular, it is determined (A) whether or not the intake pressure Pk is less than the intake pressure P1 at which the shortage begins (Pk<P1 ?) or (B) whether or not the intake pressure Pk is equal to or higher than the intake pressure P1 and is equal to or lower than the intake pressure P2 (P1≤Pk≤P2 ?). Specifically, it is determined whether or not the intake pressure Pk falls in the ventilation flow rate shortage region R by the PCV device. If the determination in step S402 is Yes in (A), that is, if the intake pressure Pk is lower than the intake pressure P1 in the non-supercharging region, the control proceeds to step S403, in which the control valve 30 is closed so as to ventilate the inside of the crankcase only by the above-described PCV device, and furthermore, the actuation of the electric vacuum pump (electric V/P) 24 is stopped. As a consequence, the blow-by gas staying inside of the crankcase 1D is recirculated to the intake passage S near the surge tank 4 or the branch pipe 3 via the oil separator 12, the first blow-by gas passage 13, and the PCV valve 14 together with the fresh air introduced into the crankcase it from the intake passage S upstream of the turbocharger via the fresh-air introduction passage 16.

In contrast, if the determination in step S402 is Yes in (B), that is, if the intake pressure Pk is equal to or higher than the intake pressure P1 and is equal to or lower than the intake pressure P2, the control proceeds to step S404, in which the control valve 30 of the second blow-by gas passage (i.e., the second piping) 28 is opened, and furthermore, the actuation of the electric vacuum pump is started. Consequently, the blow-by gas staying inside of the crankcase it is sucked by the electric vacuum pump 24 via the oil separator 12, the second blow-by gas passage 28, its opened control valve 30, and the booster passage 26 together with the fresh air introduced from the intake passage S upstream of the turbocharger via the fresh-air introduction passage 16. Here, even if the intake pressure Pk is equal to or higher than the intake pressure P1, at least a part of the blow-by gas staying inside of the crankcase it and containing the introduced fresh air is recirculated also to the intake passage S near the surge tank 4 or the branch pipe 3 by the PCV device that is operated in parallel to the electric vacuum pump 24 in the non-supercharging region in which the intake pressure is lower than the atmospheric pressure. The blow-by gas containing the fresh air sucked to the electric vacuum pump 24 is discharged to the fourth piping passage 34 communicating with the exhaust port 24out. Here, since the fourth piping passage 34 merges with both of the fifth piping passage 35 communicating with the intake passage S upstream of the compressor 2C of the turbocharger and downstream of the inlet of the fresh-air introduction passage 16 and the sixth piping passage 36 communicating with the surge tank 4 downstream of the compressor 2C of the turbocharger, the blow-by gas containing the fresh air discharged from the electric vacuum pump 24 does not flow in the surge tank 4 (i.e., the intake passage S) whose pressure is higher than the atmospheric pressure downstream of the compressor 2C, but flows in the fifth piping passage 35 communicating with the intake passage S whose pressure is close to the atmospheric pressure upstream of the compressor 2C and downstream of the inlet of the fresh-air introduction passage 16 in the supercharging region in which the intake pressure Pk is higher than the atmospheric pressure.

At this time, the fourth check valve CV4, which is disposed on the sixth piping passage 36 and serves as the flow direction restricting means for permitting only the downstream flow from the electric vacuum pump 24, can prevent the fresh air at the intake passage S downstream of the compressor 2C supercharged to a pressure higher than the atmospheric pressure from releasing to the intake passage S upstream of the compressor 2C via the sixth piping passage 36 and the fifth piping passage 35.

In contrast, in the non-supercharging region in which the intake pressure Pk is lower than the atmospheric pressure, the blow-by gas containing the fresh air flows in the sixth piping passage 36 communicating with the surge tank 4 (i.e., the intake passage S) whose pressure is lower than the atmospheric pressure downstream of the compressor 2C. At this time, the third check valve CV3 disposed on the fifth piping passage 35 can prevent the fresh air having the atmospheric pressure, flowing upstream of the compressor 2C from flowing into the intake passage downstream of the compressor 2C via the fifth piping passage 35 and the sixth piping passage 36.

In the meantime, if it is determined in step S401 that the brake negative pressure PB of the brake booster 20, detected by the pressure sensor 44 is not secured (if the determination is No), the control proceeds to step S405, in which the brake negative pressure starts to be produced. Specifically, the electric vacuum pump 24 is actuated, and furthermore, the control valve 30 is closed. As a consequence, an air is sucked from the negative pressure chamber inside of the brake booster 20 via the first check valve CV1, so that the negative pressure of the negative pressure chamber inside of the brake booster 20 increases. This brake negative pressure production in step S405 continues until the brake negative pressure PB inside of the brake booster 20 falls below the set line PB (v) and reaches the negative pressure lower limit PBm in FIG. 2.

Second Embodiment

Figure 6:
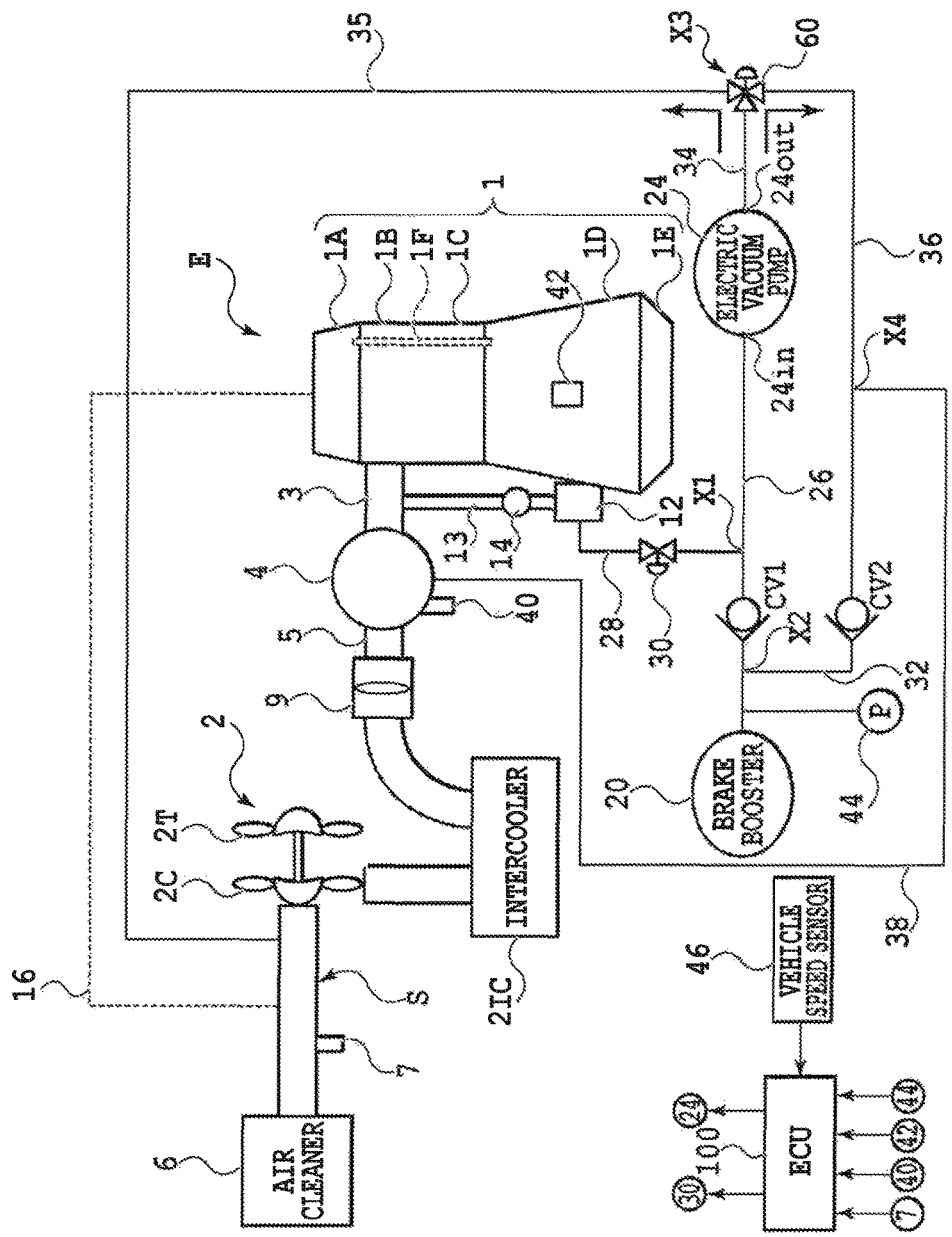
FIG. 6 is a schematic view illustrating a configuration of a second embodiment of a blow-by gas recirculation device for an internal combustion engine with a turbocharger according to the present invention.

Next, a second embodiment of the present invention will be described with reference to FIG. 6. In the first embodiment, the fourth piping passage 34 communicating with the exhaust port 24*out* of the electric vacuum pump 24 merges, at the confluent point X3, with the fifth piping passage 35 and the sixth piping passage 36, and furthermore, the third check valve CV3 and the fourth check valve CV4, which serve as the flow direction restricting means for permitting only the flow directed to a downstream side from the electric vacuum pump 24, are arranged on the way of the fifth piping passage 35 and on the way of the sixth piping passage 36, respectively. Unlike the first embodiment, in the second embodiment, these check valves are replaced with a three-way switch valve 60 provided at the confluent point X3 among the above-described fourth to sixth piping passages, for switching a channel from the fourth piping passage 34, as illustrated in FIG. 6. The other configurations are substantially identical to those in the first embodiment, and therefore, duplicate explanation will be omitted by numbering the same reference numerals to identical component parts to those in the first embodiment illustrated in FIG. 1.

Specifically, in the second embodiment illustrated in FIG. 6, the three-way switch valve 60 serving as flow direction restricting means can exclusively switch a flow from the fourth piping passage 34 to the fifth piping passage 35 and a flow from the fourth piping passage 34 to the sixth piping passage 36. In other words, the three-way switch valve 60 can switch a first position (see FIG. 7A), at which the fourth piping passage 34 communicates with the fifth piping passage 35 whereas the fourth piping passage 34 does not communicate with the sixth piping passage 36, and a second position (see FIG. 7B), at which the fourth piping passage 34 does not communicate with the fifth piping passage 35 whereas the fourth piping passage 34 communicates with the sixth piping passage 36.

In view of the above, in the present second embodiment, the channel of blow-by gas containing fresh air discharged from the electric vacuum pump 24 is switched between the first position, at which the blow-by gas flows from the fourth piping passage 34 to the fifth piping passage 35, and the second position, at which the blow-by gas flows from the fourth piping passage 34 to the sixth piping passage 36 by the switch valve 60 in a manner corresponding to the operating region described in the first embodiment.

Figure 7A:
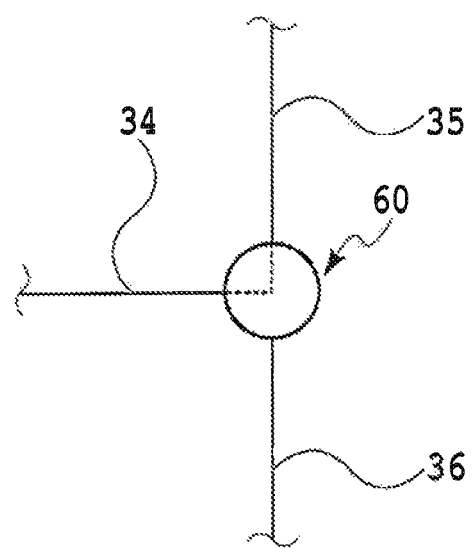
FIG. 7A is a view showing a first switch position of a three-way switch valve in the second embodiment according to the present invention.
Figure 7B:
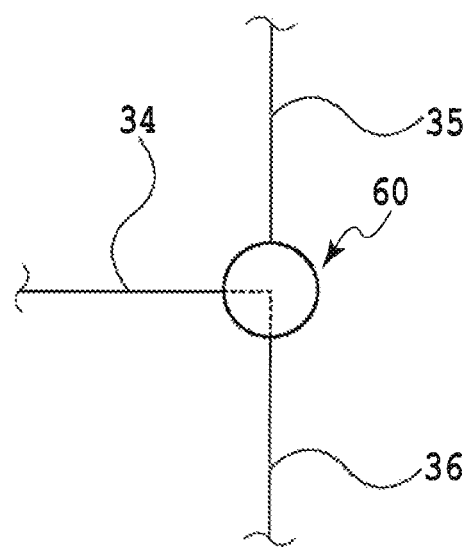
FIG. 7B is a view showing a second switch position of the three-way switch valve in the second embodiment according to the present invention.

Specifically, as described by way of the first embodiment, in the case where the intake pressure Pk is equal to or higher than the intake pressure P1 and is equal to or lower than the intake pressure P2, the three-way switch valve 60 is switched to the first position shown in FIG. 7A (a channel from the fourth piping passage 34 to the fifth piping passage 35) in the supercharging region in the operating state in which the control valve 30 disposed on the second blow-by gas passage 28 is opened, and furthermore, the actuation of the electric vacuum pump 24 is started (see step S404), and thus, the blow-by gas containing fresh air flows to the fifth piping passage 35. In contrast, the three-way switch valve 60 is switched to the second position shown in FIG. 7B (a channel from the fourth piping passage 34 to the sixth piping passage 36) in the non-supercharging region, and thus, the blow-by gas containing fresh air flows to the sixth piping passage 36. At this time, it is only required that the three-way switch valve 60 is switched by controllably driving a three-way switch valve actuator, not illustrated, by the ECU 100.

As a result of the above-described switch control, the three-way switch valve 60 can prevent fresh air flowing on the intake passage S downstream of the compressor 2C whose pressure is supercharged to a value higher than the atmospheric pressure from releasing to the intake passage S upstream of the compressor 2C via the sixth piping passage 36 and the fifth piping passage 35 in the supercharging region. In contrast, in the non-supercharging region, the three-way switch valve 60 can prevent fresh air having the atmospheric pressure, flowing upstream of the compressor 2C from flowing in the intake passage downstream of the compressor 2C via the fifth piping passage 35 and the sixth piping passage 36.

In this manner, in the second embodiment, only one switch valve is required, and therefore, the configuration can be simplified by dispensing with two check valves.

In the above-described internal combustion engines with the turbocharger, it has been determined based on the value of the intake pressure Pk whether or not the operating state of the internal combustion engines fall within the ventilation flow rate shortage region R by the PCV device. However, these determinations may be based on a value of a parameter representing the operating states of the internal combustion engine (e.g., an engine speed and a load ratio (a ratio of a load with respect to the entire load) or an engine speed and an intake air quantity). For example, on a map defined by an engine speed and a load ratio, a region R' corresponding to the above-described ventilation flow rate shortage region R may be previously determined, and then, it may be determined that the operating state of the internal combustion engine falls within the ventilation flow rate shortage region R by the PCV device when an actual engine speed and an actual load ratio fall within the region R', thereby turning on the electric vacuum pump 24 so as to start the actuation.

Moreover, although the electric vacuum pump has been used as a vacuum pump in the above-described embodiments, it is not limited to this. It is to be understood that a mechanical vacuum pump to be driven by the internal combustion engine be used.

The embodiments of the present invention encompass every modification or application and equivalents embodied by the idea of the present invention, defined by claims. Consequently, the present invention should not be restrictively interpreted, but can be applied to any other techniques pertaining within the scope of the idea of the present invention.

The invention claimed is:

1. A blow-by gas recirculation device for an internal combustion engine, the blow-by gas recirculation device including a vacuum pump serving as a negative pressure source for a brake booster, and furthermore, being utilizable for recirculating blow-by gas to an intake passage, the blow-by gas recirculation device comprising:
   a fresh-air introduction passage configured to introduce fresh air into a crankcase from an intake passage upstream of a throttle valve;
   a PCV device configured to recirculate at least a part of blow-by gas staying inside of the crankcase to an intake passage downstream of the throttle valve; and
   sucking/recirculating means configured to suck the blow-by gas staying inside of the crankcase while introducing fresh air from the fresh-air introduction passage by the use of the vacuum pump in a region in which the ventilation quantity of the blow-by gas by the PCV device is insufficient, so as to recirculate the blow-by gas to the intake passage upstream of the throttle valve, wherein the internal combustion engine is an internal combustion engine with a turbocharger having a compressor on the intake passage, and the sucking/recirculating means comprises:
a first piping passage that allows the brake booster to communicate with a suction port of the vacuum pump and has a first check valve on the way,
a second piping passage that communicates with the inside of the crankcase and merges with the first piping passage between the suction port of the vacuum pump and the first check valve, the second piping passage having a control valve on the way,
a third piping passage that is branched from the first piping passage between the brake booster and the first check valve, and has a second check valve on the way so as to communicate with the intake passage downstream of the compressor of the turbocharger,
a fourth piping passage communicating with an exhaust port of the vacuum pump, the fourth piping passage merging with both of a fifth piping passage communicating with the intake passage upstream of the compressor and downstream of an inlet of the fresh-air introduction passage and a sixth piping passage communicating with the intake passage downstream of the compressor of the turbocharger, and
at least one flow direction restrictor disposed on the fourth to sixth piping passages so as to permit only a flow directed to a downstream side from the vacuum pump.

2. The blow-by gas recirculation device for an internal combustion engine according to claim 1, wherein the at least one flow direction restrictor includes a third check valve disposed on the way of the fifth piping passage and a fourth check valve disposed on the way of the sixth piping passage.

3. The blow-by gas recirculation device for an internal combustion engine according to claim 1, wherein the at least one flow direction restrictor includes a three-way switch valve disposed at a confluent point among the fourth to sixth piping passages to switch a channel from the fourth piping passage.

4. The blow-by gas recirculation device for an internal combustion engine according to claim 1, the blow-by gas recirculation device further comprising:
pressure detecting means configured to detect an intake pressure at the intake passage downstream of the turbocharger and a brake negative pressure at the brake booster; and
control means configured to control the actuation of each of the control valve and the electric vacuum pump based on the detection result from the pressure detecting means,
wherein the control means is configured to control so as to suck the blow-by gas and recirculate the blow-by gas onto the intake passage by actuating the electric vacuum pump and opening the control valve when the detected brake negative pressure satisfies a predetermined value, and furthermore, the intake pressure falls within a predetermined range.

5. The blow-by gas recirculation device for an internal combustion engine according to claim 4, wherein the at least one flow direction restrictor includes a three-way switch valve disposed at a confluent point among the fourth to sixth piping passages to switch a channel from the fourth piping passage, the three-way switch valve being controlled based on the intake pressure detected by the pressure detecting means so as to switch a flow direction during supercharging and a flow direction during non-supercharging.

6. A blow-by gas recirculation device for an internal combustion engine, the blow-by gas recirculation device including a vacuum pump serving as a negative pressure source for a brake booster, and furthermore, being utilizable for recirculating blow-by gas to an intake passage, the blow-by gas recirculation device comprising:
a fresh-air introduction passage configured to introduce fresh air into a crankcase from an intake passage upstream of a throttle valve;
a PCV device configured to recirculate at least a part of blow-by gas staying inside of the crankcase to an intake passage downstream of the throttle valve; and
sucking/recirculating means configured to suck the blow-by gas staying inside of the crankcase while introducing fresh air from the fresh-air introduction passage by the use of the vacuum pump in a region in which the ventilation quantity of the blow-by gas by the PCV device is insufficient, so as to recirculate the blow-by gas to the intake passage upstream of the throttle valve,
wherein the internal combustion engine is of a natural aspiration type, and
the sucking/recirculating means comprises:
a first piping passage that allows the brake booster to communicate with a suction port of the vacuum pump and has a first check valve on the way,
a second piping passage that communicates with the inside of the crankcase and merges with the first piping passage between the suction port of the vacuum pump and the first check valve, the second piping passage having a control valve on the way,
a third piping passage that is branched from the first piping passage between the brake booster and the first check valve, and has a second check valve on the way so as to communicate with the intake passage downstream of the throttle valve,
a fourth piping passage communicating with an exhaust port of the vacuum pump, the fourth piping passage merging with both of a fifth piping passage communicating with the intake passage upstream of the throttle valve and downstream of an inlet of the fresh-air introduction passage and a sixth piping passage communicating with the intake passage downstream of the throttle valve, and
at least one flow direction restrictor disposed on the fourth to sixth piping passages so as to permit only a flow directed to a downstream side from the vacuum pump.

7. The blow-by gas recirculation device for an internal combustion engine according to claim 6, wherein the at least one flow direction restrictor includes a third check valve disposed on the way of the fifth piping passage and a fourth check valve disposed on the way of the sixth piping passage.

8. The blow-by gas recirculation device for an internal combustion engine according to claim 6, wherein the at least one flow direction restrictor includes a three-way switch valve disposed at a confluent point among the fourth to sixth piping passages to switch a channel from the fourth piping passage.

* * * * *